Oct. 23, 1945.                G. ORNSTEIN                2,387,406
              APPARATUS FOR APPLYING A TREATING MEDIUM
                    Filed Sept. 4, 1942        2 Sheets-Sheet 2

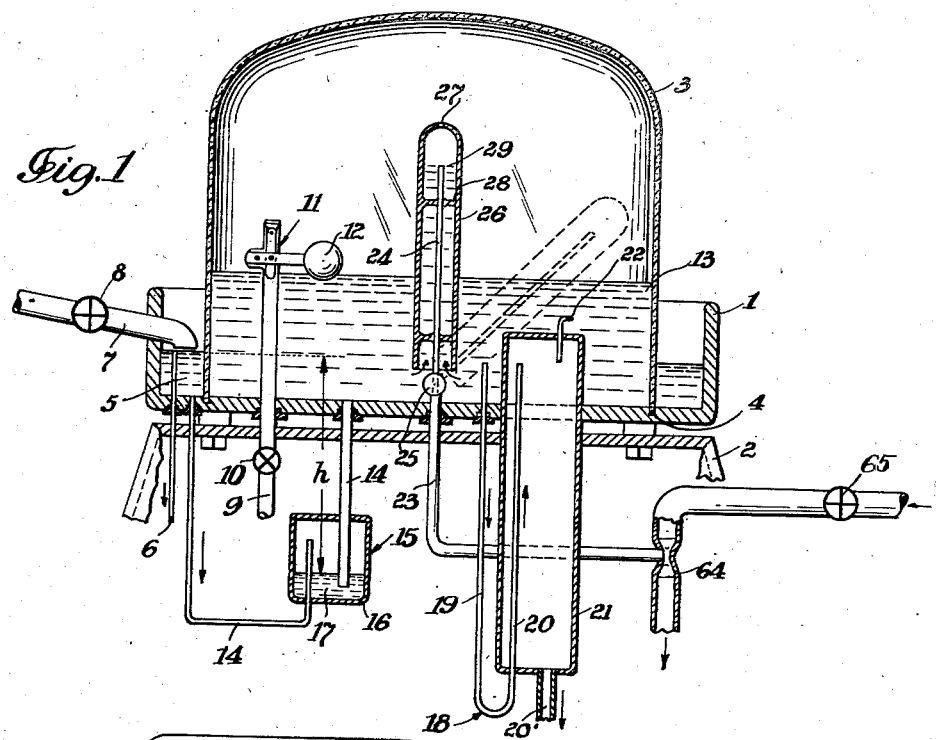
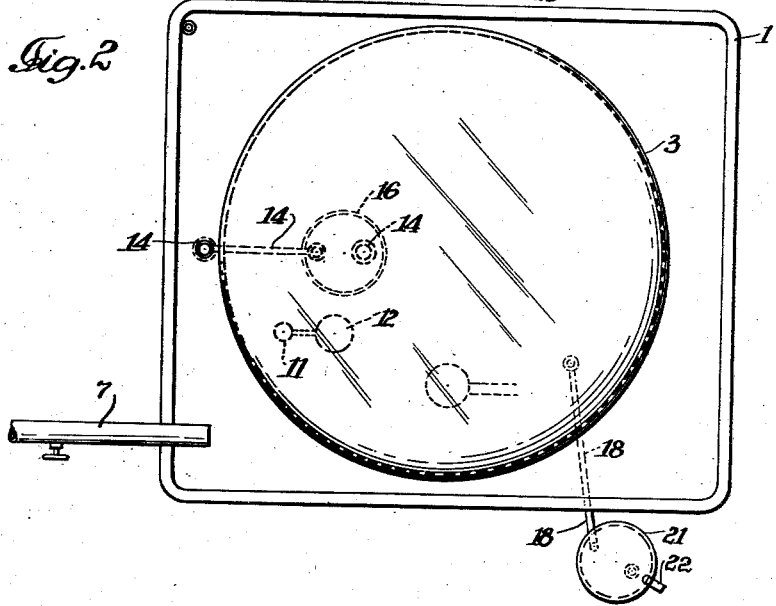

INVENTOR:
GEORG ORNSTEIN
ATTORNEY

Patented Oct. 23, 1945

2,387,406

UNITED STATES PATENT OFFICE 2,387,406

APPARATUS FOR APPLYING TREATING MEDIUMS

Georg Ornstein, New York, N. Y.

Application September 4, 1942, Serial No. 457,293

14 Claims. (Cl. 210—28)

My invention relates to an apparatus for supplying a treating medium, preferably a treating gas at a controlled rate and more particularly to an apparatus for supplying chlorine or sulphur dioxide gas at a controlled and measured rate to a flowing medium, such as water, for instance, water of cities or sewage.

In the treating of water with chlorine or any other suitable treating gas, the chlorine is fed into the stream of water to be treated. In order to know the amount of chlorine being supplied, the rate of supply of chlorine must be accurately controlled and measured. Various methods of control are known. One that is widely known and has been preferably used in chlorine-controlled apparatus is to cause the gas to pass through a flow-controlling orifice and to control the rate of flow of the gas by measuring and varying the drop of pressure across the orifice.

Apparatus based on this method of control comprise a container such as a bell-jar into which treating medium, for example, chlorine gas, is admitted and means for withdrawing the treating medium after it has passed through the flow-controlling opening. The container is partly filled with a suitable liquid, such as water, the level of which is controlled by the suction of a partial vacuum maintained in said bell-jar. Hence, a certain varying quantity of liquid will be sucked into the container and flow out again after having been exposed to the treating medium. During this exposure certain quantities of the treating medium, for example, chlorine, will be dissolved in the treating medium and escape from the container when the liquid flows from the container into the open. Such escaping quantities of chlorine or other treating medium may not be dangerous but they produce a very unpleasant odor. They will also tarnish and even corrode metal parts exposed to them.

A principal object of my invention is to provide means for preventing any flow of liquid in which treating medium, such as chlorine gas, is or may be dissolved from a closed part of the apparatus into the open where it may produce an unpleasant odor or tarnish and corrode metal parts.

A more specific object of my invention is to provide means permitting the flow of liquid from a supply of liquid into a closed part of the apparatus and discharging any exposed liquid when leaving the closed part of the apparatus directly into waste or any intended other place where odors emanating from the exposed liquid are not offensive, and where there is no danger of tarnish or corrosion of metal parts.

Another object of my invention is to provide connecting means permitting a free flow of liquid between open and closed parts of the apparatus and to include a chemical valve in these connecting means that prevents the escape of dissolved treating medium into an open part of the apparatus.

Other and further objects of my invention will hereinafter be set forth and the novel features thereof defined by the appended claims.

My invention is applicable to various apparatus for supplying a treating medium of the class described. It is particularly not limited to the use of any specific means for controlling the pressure drop across the flow-controlling orifice. My invention is equally useful whether the pressure of the treating medium is controlled on the upstream side or on the downstream side of the orifice by any means whatsoever.

My present application is a continuation in part of my co-pending application Ser. No. 426,165, filed January 9, 1942, and my co-pending application Ser. No. 441,261, filed May 1, 1942.

In the accompanying drawings several embodiments of my invention are shown.

Figure 1 shows a sectional side view of a sealing device according to my invention in combination with a chlorinator with pressure regulation on the downstream side of the flow-controlling orifice.

Figure 2 is a plan view of a device according to Figure 1.

Figure 4:
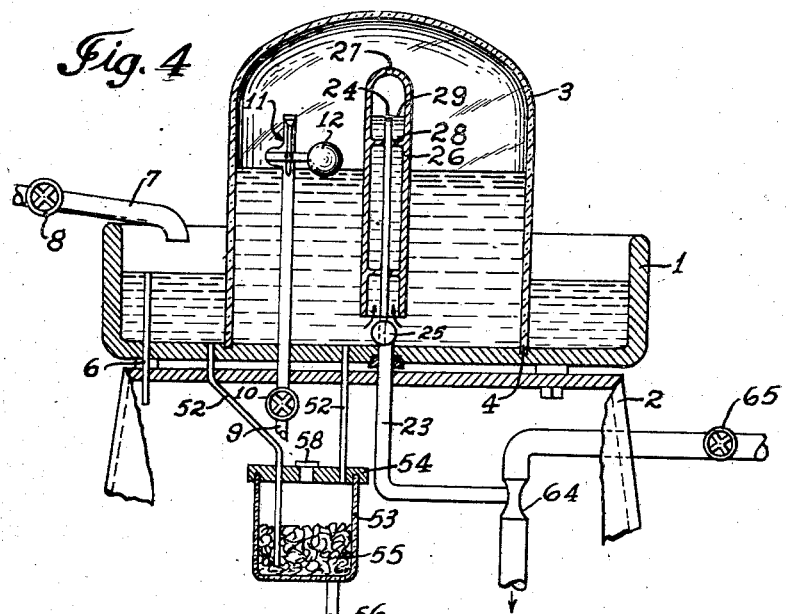
Figure 4 is a third embodiment of a sealing device according to my invention in combination with a chlorination of the type shown in Figures 1 and 2.

The chlorinator shown in Figure 1 comprises a tray or open receptacle 1, which may be made of any suitable material, for example, hard rubber or material known under the trade name "Lucite" and which is supported by a standard 2 of conventional design. In the tray a container such as a bell jar 3 of preferably transparent material, for example glass is placed. Bell jar 3 is sealed to the bottom of tray 1, for instance, by inserting it into a circular groove 4. In tray 1 a body of liquid such as water 5 is maintained at a predetermined level, preferably by an over-flow tube 6. The water may be admitted through spigot 7. The admission of water can be controlled by a valve 8 or a float valve of conventional design. A treating medium, for example chlorine gas is admitted into bell-jar 3 through a pipe 9 which is controlled by a conventional valve 10. Pipe or tube 9 is provided at its top with a float valve 11 having a float 12. Float valve 11 will open and admit fresh chlorine gas as soon as the liquid 13, for example water, within bell-jar 3 reaches a certain level. If the water drops below this level the float valve will close again. By this means, a constant water level may be maintained inside bell-jar 3, irrespective of the level of water in tray 1 and a constant flow of chlorine gas is assured.

In order to permit the exchange of water between bell-jar and tray, it is known to provide vents or passages permitting the flow of liquid from the tray into the bell-jar and vice-versa. While water is within bell-jar 3, it is exposed to chlorine gas admitted into bell-jar 3 and certain quantities of chlorine will be dissolved in the water. When such exposed water flows back into tray 1, the dissolved chlorine will produce a very unpleasant odor and tarnish or corrode any exposed metal parts. Such backflow of water is usually due to a slight leakage of valve 11 which in practice is often unavoidable. In accordance with my invention, I prevent any escape of such exposed water from the bell-jar into the open. As previously explained, I avoid any direct communication between the tray and the interior of the bell-jar by sealing bell-jar 3 to the bottom of tray 1. The tray is connected with bell-jar 3 by a conduit 14. In this conduit is included a seal of any suitable design permitting the flow of liquid only in the direction indicated by arrows. I have found it preferable to use a seal 15 comprising a container 16 which is partly filled with any suitable sealing liquid 17, for example water. Conduit 14 is passed through the bottom of tray 1 and preferably flush with it. In order to discharge liquid from container 3 to waste, I provide communicating tubes 18. One of these tubes, tube 19 is extended into bell-jar 3. It may end at the same level as overflow tube 6 or below this level. The other tube 20 is disposed outside of bell-jar 3 and preferably arranged within a closed container 21 which is provided with a blow-off pipe 20'. Tube 20 should preferably end at the same level as over-flow tube 6. A tube 22 serves to discharge liquid from container 21 into waste or any other place where chlorine odors are not offensive.

Passing up through the bottom of tray 1 is a pipe 23 which communicates with the throat of an aspirator or injector 64. This injector may be controlled by a valve 65 of conventional design. A current of liquid, for example water, is flowing through injector 64 and produces the necessary suction power. With the upper end of tube 23 a second tube 24 is pivotally connected. The pivotal connection can be made by any suitable means, for instance, by a joint 25 which is provided with a passage connecting tubes 23 and 24. Tube 24 is surmounted by a meter tube 26 containing a small orifice 27 in its otherwise closed top. The lower end of tube 26 is open and extends below the level of the water in bell-jar 3. Tube 26 is secured to inner tube 24 by any suitable means, for instance by brackets or cross bars 28 and can be pivoted together with tube 24 about joint 25. The inner diameter of tube 24 is preferably so far reduced at its top 29 or in any other suitable point that it is only slightly larger than the diameter of orifice 27. This restriction of tube 24 will reduce the amount of water which can be aspirated through tube 24 without affecting the volume of chlorine that can be sucked into orifice tube 26.

When water is admitted by spigot 7 into tray 1 the water level outside of bell-jar 3 will rise until the water reaches the edge of over-flow tube 6. The admitted water will flow through conduit 14 and seal 15 into bell-jar 3 since the seal is only open in the direction indicated by the arrows.

The air in container 16 is compressed by liquid 17 until it balances the column $h$. Water entering container 16 from tray 1 will ooze out from conduit 14 and a corresponding amount of water will be forced into jar 3 by the air cushion in container 16, since the water column $h$ will not balance a higher water level in container 16. Water trying to enter container 16 from jar 3 cannot reach conduit 14 leading to tray 1 but will merely compress the air above liquid 17 slightly which will result in the discharge of some air through conduit section 14 leading into tray 1.

The liquid level within bell-jar 3 will rise until it corresponds approximately to the water level outside of the bell-jar. As soon as aspirator 64 begins to operate, the suction produced by it will draw chlorine through orifice 27 from the upper part of the bell-jar, through tube 24, joint 25 and tube 23 into the throat of the aspirator. The suction of the aspirator produces a partial vacuum in the bell-jar and causes the level of the water therein to rise above that in tray 1 as indicated in Figure 1. The rate of flow of chlorine is determined by the difference in pressure in the bell-jar and within orifice tube 26. Since the capacity of the aspirator is greater than the amount of gas admitted through orifice 27 in the top of tube 26 and since the lower end of tube 26 is open and below the level of the water in the bell-jar, the suction of the aspirator will cause to rise the level of the water in tube 26 up to the level of the top of tube 24. A certain amount of the raised water will flow off through tube 24 in which it is mixed with the aspirated chlorine. The solution of chlorine and water thus formed will be discharged into the stream of liquid flowing through injector 64. The pressure acting to draw off the gas will be indicated by the difference of the level of water in tube 26 and the water level in the bell-jar. Consequently the pressure acting to draw off gas can be adjusted and regulated by tilting tubes 24 and 26 about joint 25. Tubes 24 and 26 can be tilted around the pivot by any suitable means.

Normally, no or very little water will flow from bell-jar 3 back into the open tray as the liquid level in bell-jar 3 will remain substantially constant and any aspirated water flows off through tube 24. It shall now be assumed that the liquid level within bell-jar 3 begins to sink due to a leakage of valve 11. The water cannot flow back through conduit 14 into the open tray since the air cushion within closed container 16 of seal 15 will prevent such back flow. Hence the liquid will be forced to flow off through communicating tubes 18 since the water column above tube 19 will overcome the hydrostatic pressure on tube 20. Consequently, water will flow out through container 21 and pipe 20 until the liquid level in bell-jar 3 corresponds to the liquid level outside of the bell-jar. I hereby accomplish that none of the liquid within bell-jar 3 which has been exposed to chlorine or other treating medium can flow back into the open tray.

Figure 3:
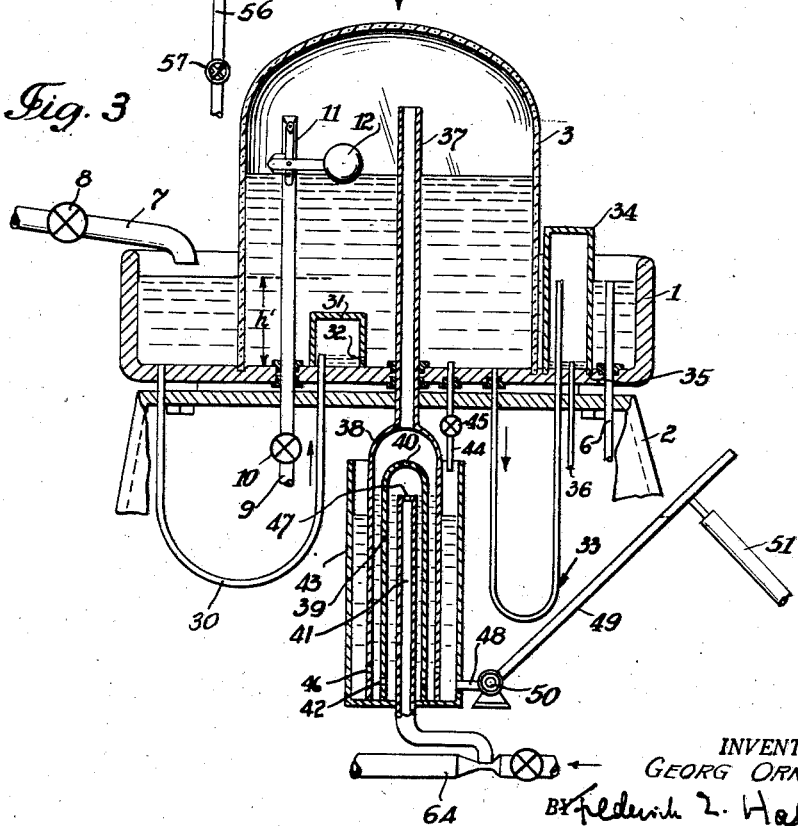
Figure 3 is a sectional side view of a modification of a device according to the invention in combination with a chlorinator with pressure regulation on the upstream side of the flow-controlling orifice.

Figure 3 shows a second embodiment of a sealing device according to my invention which is very effective and simple in design in application to a chlorinator with pressure control on the up stream side of the flow controlling orifice.

The same numerals designate the same elements as shown in Figures 1 and 2.

A conduit 30 serves to admit water from the body of water in tray 1 into bell jar 3. The end of conduit 30 communicating with tray 1 may be flush with the bottom of tray 1. The other end of the conduit is covered by a closed receptacle or container 31 which is provided with one or more openings 32 disposed slightly below the level of the end of conduit 30 in practice about ⅛ to ¼ of an inch. This arrangement serves as a seal permitting the flow of water from tray 1 through conduit 30 into bell jar 3 and preventing a flow of liquid in the opposite direction.

The air cushion formed within container 31 by the water filling the container up to the level of conduit 30 permits the inflow of water through conduit 30 and the outflow through openings 32 but resists an inflow of water through openings 32 and outflow through conduit 30. The water column in container 31 is balanced by the water column $h'$ indicated in Fig. 3.

The discharge of water from the bell-jar is controlled by a second seal. I have found it preferable to provide a seal comprising a U-shaped tube 33 which connects bell-jar 3 with a closed container 34. This container is placed tightly on the bottom of tray 1, for instance, by inserting it into a circular groove 35 provided in the bottom of tray 1. The end of tube 33 within container 34 is preferably on the same level as overflow tube 6. A second tube 36 serves to discharge water from container 34 into waste or any other convenient place. The second seal permits a flow of water only in the direction from bell-jar 3 to waste. Water entering container 34 through U-tube 33 will be discharged through pipe 36 but a reversed flow is not possible due to the air cushion found within closed container 34. This air cushion will prevent the inflow of water through pipe 36. The function of container 31 is similar to the function of seal 15.

The treating gas, for example, chlorine, is admitted in the bell-jar through float valve 11 as described in connection with Figures 1 and 2. The chlorine is withdrawn from the bell-jar through a pipe 37, the top of which ends above the level of the liquid within the bell-jar as controlled by float valve 11. The lower end of pipe 37 is widened to form a cylinder 38. Within this cylinder is disposed an orifice tube 39 having an orifice 40. Orifice tube 39 surmounts a pipe 41 serving to discharge chlorine drawn through orifice 40 and water entering at the bottom of orifice tube 39 through openings or vents 42. Pipe 41 communicates with the throat of injector 64. Cylinder 38 is placed in a second cylinder 43 open at the top. Water is admitted into this open cylinder by means of a tap or spigot 44 communicating with the interior of bell-jar 3. The flow of water through spigot 44 may be controlled by a valve 45 of conventional design. One or more openings 46 close to the bottom of cylinder 38 connect the body of water in cylinder 43 with the interior of cylinder 38 which, in turn, communicates with the interior of orifice cylinder 38 through vents or openings 42. Consequently water admitted through tap 44 into cylinder 43 will enter the orifice tube and be aspirated through discharge pipe 41. The inner diameter at the top 47 of this pipe or at any other suitable point of the length is preferably so far reduced that it is only slightly larger than the diameter of orifice 40. Outer cylinder 43 is connected by an intermediate pipe 48 with a tube 49 which is pivotal about pivot point 50 to permit an angular adjustment of pipe 49. Pipe 49 is connected with waste by a flexible tube 51, for example, a rubber hose.

The operation of the apparatus is as follows: Assuming water is flowing through injector or aspirator 64 and water is admitted into tray 1 through spigot 7 then water will be sucked into bell-jar 3 until it reaches a substantially constant level controlled by chlorine float valve 11. The seal 31 included in conduit 30 connecting bell-jar and tray will not prevent such flow of water, since the seal is open in this direction. Chlorine is aspirated through pipe 37 and orifice 40 from bell-jar 3 and discharged through pipe 41 together with water entering this pipe. The negative head on the downstream side of orifice 40 will remain substantially constant and is equal to the column of liquid between the openings 42 and 47. The amount of chlorine which is drawn through orifice 40 will depend on the difference between the water level within cylinder 38 and the water level in outer cylinder 43. The water level within the orifice tube is determined by the upper edge of discharge pipe 41. The water level in outer cylinder 43 is determined by the position of the over-flow level of tiltable tube 49. The water column in cylinder 43 counterbalances the water column in cylinder 39. The lower the level of water in cylinder 43, the less will be the difference between the negative head on the upstream side of orifice 40 and on the downstream side of the orifice until finally the pressure on the upstream side of orifice 40 becomes equal to the pressure on the downstream side at the level of the openings 46 which should be located slightly higher than the openings 42. Then no chlorine will be drawn through orifice 40. On the other hand, when the water column in cylinder 43 reaches the level of the water column in cylinder 39 the pressure on the upstream side of orifice 40 will be equal to atmospheric pressure and the pressure drop across orifice 40 will reach a maximum, the negative pressure on the downstream side of the orifice remaining constant.

The adjustable tube 49 affords a simple means for controlling the water level within cylinder 43. Since cylinder 43 and tube 49 form communicating tubes, the water level within cylinder 43 and with it the volume of gas drawn through orifice 40 can be regulated by the simple expedient of adjusting the angular position of tube 49.

When the water level within bell-jar 3 recedes, for example due to a leakage of float valve 11 or an increased chlorine pressure within bell-jar 3, the water cannot flow back from bell-jar 3 into open tray 1 through conduit 30, since the air cushion formed within container 31 will block such back flow, as previously explained. Consequently, the water is forced to flow through conduit 33 into container 34 and is discharged through pipe 36.

Figure 4 shows a third preferred embodiment of a sealing device according to my invention which is very effective and simple in design in application to a chlorinator of the type shown in Figures 1 and 2.

The body of water in tray 1 is connected with the interior of container or bell-jar 3 through a conduit 52, both ends of which may be flush with the bottom of tray 1. This conduit permits a free circulation of liquid in either direction. In order to prevent the flow of chlorinated liquid from the bell-jar back into the open tray 1, I include in conduit 52 means which prevent the escape of chlorine from bell-jar 3 while the water is flowing from the container through conduit 52 into tray 1. These means are based upon the property of certain materials to react with chlorine dissolved in water and to bind it while not entering into any reaction with substantially pure water. These means, which may be called a chemical valve, comprise a container 53 which connects two sections of conduit 52. Container 53 is closed by a tight fitting cover 54. Of course, it is possible to provide any other tight cover for the container. The container is partly filled with a material 55 that will react with chlorine in presence of water or with any other treating medium used. Most metals, for example iron, zinc, copper or aluminum will react with chlorine dissolved in water and bind it while they do not react with substantially pure water. The metals used should be in a shape offering a large surface to liquid passing through container 53. They should not be heavily oxidized and be substantially free of grease and oil. They may be in granulated form or turnings or chips may be used. In addition to metals highly adsorbent materials such as carbon in granulated form preferably activated carbon will give good results.

The conduit section connecting the tray with container 53 should end within the supply of metal or carbon 55 preferably close to the bottom of container 53 and the conduit section connecting bell-jar 3 with container 53 may discharge through cover 54 ending flush with it. In order to clean container 53 and material 55, a drain pipe 56 controlled by a conventional valve 57 may be provided. From time to time material 55 should be renewed preferably by means of a cover hole closed by a stopper 58.

Substantially pure water flowing from tray 1 into bell-jar 3 will not be affected by the metal or carbon in container 53, but chlorine gas dissolved in the water will be bound by the metal or converted by the carbon in container 53 when discharged into this container through conduit 52 from bell-jar 3, for example, if metal turnings are used, their respective metal chloride will be formed. Carbon will convert chlorine into hydrochloric acid which in this dilution has no smell. After having passed through container 53, the dechlorinated liquid will continue through conduit 52 and flow back into tray 1.

Chlorine is admitted into bell jar 3 through the pipe 9 controlled by valve 10. The pipe 9 is provided at its top with a float valve 11 including float 12. This float valve will control the admission of chlorine into the bell jar as has been explained in connection with the description of Figures 1 and 2.

The discharge of chlorine from the bell jar is controlled by means of the orifice tube 26, the tube 24 and the injector or aspirator 64. Orifice tube 26 and the discharge tube 24 are pivotally arranged. The operation of the chlorine discharge means has been described in detail in connection with Figures 1 and 2.

The sealing device according to my invention has been illustrated in combination with certain types of apparatus for applying a treating medium. However, as previously explained, my invention is not limited to any particular type of apparatus. It is useful for all chlorinators of the vacuum type and also for certain chlorinators of the so-called pressure type. Furthermore, the sealing device according to my invention is not limited to the admission of liquid into and discharge from the main bell-jar, but it can also be used for the admission of liquid into and the discharge from an auxiliary bell-jar such as described in my co-pending application Ser. No. 441,261.

Finally, I do not want my invention to be limited to the embodiments of the sealing device shown in the drawings and described herein, as various changes can be made without departing from the scope of my invention.

Having thus described my invention, what I claim as new and desire to secure by Letters Patent is:

1. In an apparatus for supplying a sterilizing gas to a liquid to be sterilized in combination an open receptacle in which is maintained a body of liquid, means for supplying liquid to said receptacle, a closed container placed in said open receptacle, means for admitting said gas into said container, suction means for withdrawing said gas from said container and feeding it into said liquid to be sterilized, connecting means for admitting liquid from said receptacle into said gas filled container and a liquid seal included in said connecting means preventing the back flow of liquid charged with gas from said container into said open receptacle.

2. In an apparatus for supplying a sterilizing gas to a liquid to be sterilized in combination a tray in which is maintained a body of liquid, means for supplying said liquid to said tray, a closed container placed in said tray, means for admitting said gas into said container, suction means for withdrawing said gas from said container and feeding it into said liquid to be sterilized, connecting means for admitting liquid from said tray into said gas filled container, a seal included in said connecting means preventing the back flow of liquid charged with gas from said container into said tray, and means for discharging liquid from said gas filled container into waste.

3. In an apparatus for supplying a sterilizing gas to a liquid to be sterilized in combination a tray in which is maintained a body of liquid, means for supplying said liquid, a closed container placed in said tray, a conduit for discharging liquid from said tray into said container, a seal included in said conduit for permitting the flow of liquid only in the direction from said tray to said container, said seal comprising a closed receptacle provided within said container into which receptacle said conduit discharges and which communicates with the container at a level lower than the discharge level of said conduit, a second conduit for discharging liquid from said container into waste, a second seal included in said second conduit for discharging liquid from said container into waste, said second seal comprising a closed receptacle into which said second conduit discharges and which is connected with waste at a level lower than the discharge level of said second conduit, means for admitting said gas into said container and suction means for withdrawing said gas from said container and feeding it into said liquid to be sterilized.

4. In an apparatus for supplying a sterilizing gas to a liquid to be sterilized, in combination a tray in which is maintained a body of liquid, means for supplying said liquid, a closed container placed in said tray, a conduit for discharging liquid from said tray into said container, a liquid seal included in said conduit open for the flow of liquid only in the direction from said tray into said container, communicating tubes for discharging liquid from said container into waste, one branch of said tubes opening into said container and the other communicating with waste, means for admitting said gas into said container and suction means for withdrawing said gas from said container and feeding it into said liquid to be sterilized.

5. In an apparatus for supplying sterilizing gas to liquid to be sterilized in combination a tray in which is maintained a body of liquid, means for supplying said liquid, a closed container placed in said tray, a conduit for discharging liquid from said tray into said container, a liquid seal included in said conduit open for the flow of liquid only in the direction from said tray into said container, means for discharging liquid from said container to waste, means for admitting said gas into said container, and means for withdrawing said gas from said container at a controlled rate and feeding it into said liquid to be sterilized, said latter means comprising a member providing a flow-controlling orifice, a suction device for drawing said gas through said flow-controlling orifice and a member for controlling the drop of pressure across the orifice and feeding said gas drawn through said orifice by said suction device into said liquid to be sterilized.

6. In an apparatus, as described in claim 19, said control member being pivotally arranged for varying the drop in pressure across said orifice.

7. In an apparatus for supplying a sterilizing gas to a liquid to be sterilized in combination a tray in which a body of liquid is maintained, means for supplying said liquid, an inverted bell-jar placed in said tray, a conduit for discharging liquid from said tray to said bell-jar, a seal included in said conduit open for the flow of liquid only in the direction from said tray to said bell-jar, said seal comprising a closed receptacle provided within said bell-jar into which receptacle said conduit discharges and which communicates with the bell-jar at a level lower than the discharge level of said conduit, a second conduit for discharging liquid from said bell-jar into waste, a second seal included in said second conduit open for the flow of liquid only in the direction from said bell-jar into waste, means for admitting gas into said bell-jar, means for withdrawing gas from said bell-jar and feeding it into said liquid to be sterilized, said latter means comprising a member providing a flow-controlling orifice having an upstream side and a downstream side, a suction device for drawing said gas through said flow-controlling orifice, and a member for feeding said gas drawn through said orifice by said suction device into said liquid to be sterilized and means for controlling the flow of said gas through said orifice, said controlling means including means for maintaining a certain pressure drop of the gas from the upstream side to the downstream side of said flow-controlling orifice, means for counter-balancing said pressure at least partly, and means for regulating said counterbalancing means.

8. In an apparatus for supplying a sterilizing gas to a liquid to be sterilized in combination an open receptacle in which is maintained a body of liquid, means for supplying liquid to said receptacle, a closed container communicating with said open receptacle, means for admitting said gas into said container, means for withdrawing said gas from said container and feeding it into said liquid to be sterilized, a conduit connecting said open receptacle with said container for permitting a free flow of liquid between said open receptacle and said container and means included in said conduit adapted to arrest any gas dissolved in the liquid being within said container while the liquid flowing between the receptacle and the container is passed through said means, thus preventing the back flow of gas from said container into said open receptacle.

9. In an apparatus for supplying a sterilizing gas to a liquid to be sterilized in combination an open receptacle in which is maintained a body of liquid, means for supplying liquid to said receptacle, a closed container placed in said open receptacle, means for admitting said gas into said container, means for withdrawing said gas from said container and feeding it into said liquid to be sterilized, a conduit connecting said open receptacle with said container for permitting a free flow of liquid between said receptacle and said container, a supply of material adapted to react chemically with said gas dissolved in said liquid and to bind it included in said conduit, thus freeing the liquid flowing between the receptacle and the container from dissolved gas while said liquid is flowing back through said conduit from said container into said receptacle.

10. In an apparatus for supplying chlorine to a stream of water in combination a tray in which is maintained a body of water, means for supplying water to said tray, a closed container placed in said tray, means for admitting said chlorine into said container, means for withdrawing said chlorine from said container and feeding it into said stream of water, a conduit connecting said tray with said container for permitting a free flow of water between said tray and said container, a supply of metal adapted to react with chlorine dissolved in water included in said conduit for binding any chlorine dissolved in the water while being within said container when the water flowing between the receptacle and the container is in contact with said supply of metal, thus preventing the escape of chlorine from said closed container into the open.

11. In an apparatus for supplying chlorine to a stream of water in combination a tray in which is maintained a body of water, means for supplying water to said tray, a closed container placed in said tray, means for admitting said chlorine into said container, means for withdrawing said chlorine from said container and feeding it into said stream of water, a conduit connecting said tray with said container for permitting a free flow of water between said tray and said container, a supply of carbon adapted to react with chlorine dissolved in water included in said conduit for binding any chlorine dissolved in the water while being within said container when the water flowing between the receptacle and the container is in contact with said supply of carbon, thus preventing the escape of chlorine from said closed container into the open.

12. In an apparatus for supplying chlorine to a stream of water in combination a tray in which is maintained a body of water, means for supplying water to said tray, a closed container placed in said tray, means for admitting said chlorine into said container, means for withdrawing said chlorine from said container and feeding it into said stream of water, a conduit connecting said tray with said container for permitting a free flow of water between said tray and said container, a supply of activated carbon adapted to react with chlorine dissolved in water included in said conduit for binding any chlorine dissolved in the water while being within said container when the water flowing between the receptacle and the container is in contact with said supply of activated carbon, thus preventing the escape of chlorine from said closed container into the open.

13. In an apparatus for supplying chlorine to a stream of water in combination a tray in which is maintained a body of water, means for supplying water to said tray, a closed container placed in said tray, means for admitting said chlorine into said container, means for withdrawing said chlorine from said container and feeding it into said stream of water, a conduit connecting said tray with said container for permitting a free flow of water between said tray and said container, a receptacle containing pieces of metal adapted to react with chlorine dissolved in water included in said conduit for binding chlorine dissolved in the water when water containing dissolved chlorine is passing through said receptacle, thus freeing the water flowing through the conduit from said chlorine while said water is flowing through said receptacle.

14. In an apparatus for supplying chlorine to a stream of water in combination a tray in which is maintained a body of water, means for supplying water to said tray, a closed container placed in said tray, means for admitting said chlorine into said container, means for withdrawing said chlorine from said container and feeding it into said stream of water, a conduit connecting said tray with said container for permitting a free flow of water between said tray and said container, a receptacle containing pieces of carbon adapted to react with chlorine dissolved in water included in said conduit for binding chlorine dissolved in the water within said container while the water flowing through the conduit is passing through said receptacle, thus freeing said water from dissolved chlorine while chlorinated water is flowing from said container through said conduit and said receptacle into said tray.

GEORG ORNSTEIN.